US012077991B2

(12) United States Patent
Goldman

(10) Patent No.: US 12,077,991 B2
(45) Date of Patent: Sep. 3, 2024

(54) HALF-CYLINDER LOCK

(71) Applicant: KNOCK N'LOCK LTD., Yokneam (IL)

(72) Inventor: Ilan Goldman, Herzliya (IL)

(73) Assignee: KNOCK N'LOCK LTD., Yokneam (IL)

( * ) Notice: Subject to any disclaimer, the term of this patent is extended or adjusted under 35 U.S.C. 154(b) by 0 days.

(21) Appl. No.: 18/286,318

(22) PCT Filed: Apr. 13, 2022

(86) PCT No.: PCT/IL2022/050390
§ 371 (c)(1),
(2) Date: Oct. 10, 2023

(87) PCT Pub. No.: WO2022/219633
PCT Pub. Date: Oct. 20, 2022

(65) Prior Publication Data

US 2024/0084619 A1 Mar. 14, 2024

(30) Foreign Application Priority Data

Apr. 14, 2021 (IL) ........................................ 282345

(51) Int. Cl.
*E05B 47/00* (2006.01)
*E05B 65/44* (2006.01)

(52) U.S. Cl.
CPC .. *E05B 47/0012* (2013.01); *E05B 2047/0017* (2013.01); *E05B 2047/0024* (2013.01); *E05B 2047/0036* (2013.01); *E05B 2047/0067* (2013.01); *E05B 2047/0095* (2013.01); *E05B 65/44* (2013.01)

(58) Field of Classification Search
CPC ...... E05B 47/00; E05B 47/0012; E05B 65/44; E05B 2047/0017; E05B 2047/0024; E05B 2047/0036; E05B 2047/0067; E05B 2047/0095; Y10T 70/5031
USPC .............................................................. 70/63
See application file for complete search history.

(56) References Cited

U.S. PATENT DOCUMENTS

| | | | | |
|---|---|---|---|---|
| 6,895,792 | B2 | 5/2005 | Davis | |
| 8,720,238 | B1 | 5/2014 | Davis | |
| 11,339,589 | B2 * | 5/2022 | Allen | E05B 47/0005 |
| 2014/0300117 | A1 | 10/2014 | Scheffler et al. | |
| 2020/0240174 | A1 | 7/2020 | Chang et al. | |
| 2021/0381276 | A1 * | 12/2021 | Zou | E05B 47/0661 |

FOREIGN PATENT DOCUMENTS

| | | | |
|---|---|---|---|
| CA | 3214994 | A1 * | 10/2022 |
| CN | 1163690 | A | 10/1997 |
| CN | 105298243 | A | 2/2016 |
| CN | 109869051 | A | 6/2019 |
| CN | 209132836 | U | 7/2019 |
| CN | 210858273 | U | 6/2020 |
| DE | 10 2006 012 196 | B3 | 8/2007 |
| EP | 0 401 647 | A1 | 12/1990 |
| FR | 2 849 083 | A1 | 6/2004 |

* cited by examiner

*Primary Examiner* — Suzanne L Barrett
(74) *Attorney, Agent, or Firm* — Maschoff Brennan

(57) ABSTRACT

The present disclosure concerns a half-cylinder type lock, typically a keyless electrical lock, usable in communication cabinets or other installations requiring secured access control. The lock mechanism does not have elements protruding out of the lock housing to prevent possibility of tampering.

17 Claims, 9 Drawing Sheets

HALF-CYLINDER LOCK

TECHNOLOGICAL FIELD

The present disclosure concerns a half-cylinder type lock, typically a keyless lock, usable in communication cabinets or other installations requiring secured access control.

BACKGROUND

Half-cylinder type locks, in which opening and closing is only from an exterior end of a closure, are well-known and used in installations were opening and locking is only from the exterior. Communication equipment and security cabinets are examples of such installations.

The simplest half-cylinder locks are mechanically operated by making use of a dedicated key. There are also known half-cylinder locks that are electronically controlled. One issue with such locks is that the space inside the lock housing is limited and there is, thus, insufficient space to house the electronic elements (including a battery, electric motor or another electric actuator and control module). Examples of prior art electronic half-cylinder locks can be seen in FIGS. 1A-3.

The lock shown in FIG. 1A operates with a key shown in FIG. 1B. The key houses an electronic module that communicates with electronic components within the lock through dedicated electrical contacts on the key. Thus, for operation of the lock, the key and also the inter-key electronic module need to match the lock, giving rise to an enhanced security. One inherent characteristic is the requirement for dedicated keys that limit access to only holders of such keys.

The lock shown in FIG. 2A is a wirelessly operated lock that communicates wirelessly with an electronic key, such as that shown in FIG. 2B. The key has an electronic module that stores encrypted access codes and a list of locks that may be accessed thereby. The electronic module may also store schedules or authorized dates and times for access. The key also houses the battery that energizes the lock to permit its operation.

FIG. 3 shows a keyless half-cylinder lock fitted on a swing handle lock arrangement. It has an external knob that houses most of the electronic elements of the lock. One issue is that such a lock is vulnerable to mechanical damage and can be relatively easily tampered.

GENERAL DESCRIPTION

The present disclosure provides a half-cylinder lock that has a number of unique features. On the one hand, the whole lock mechanism is housed within the closure, with no elements protruding out of the closure's external surface. In addition, the half-cylinder lock of this disclosure is highly secure and permits access only to users carrying a handle-held device (e.g. a smartphone) that wirelessly communicates with the lock's control utility to define authorized access. By an embodiment of this disclosure, the lock's control utility can provide a lock status indication that may be transmitted to the user-held device and therefrom transmitted to a control center. Alternatively, the lock can transmit such an indication directly through communication lines that may exist within the space closed by the closure, e.g. communication infrastructure within a communication equipment cabinet (the link between the control utility and the communication infrastructure may be wired or wireless). Furthermore, the half-cylinder lock of this disclosure can be used to retrofit less secure half-cylinder locks relatively easily, including fully mechanical or electronic locks such as those shown in FIGS. 1A-3.

Provided by this disclosure is a half-cylinder lock that includes a lock body and an electronic utility. The lock body is receivable within a lock cavity that is defined in a closure between an external face thereof and an inner end wall of the lock cavity. The lock body has an overall external shape similar or identical to that of prior-art lock bodies, and when retrofitting a closure with the lock of this disclosure, the lock body can be fitted within the lock cavity that housed the prior art lock body.

The lock body comprises a cylinder, a lock piston that is received within the cylinder, a biasing member coupled to the piston for biasing the piston into an extended position (which as noted below is the position in which a proximal portion of the piston protrudes outside the external face of the closure), a lock cam which is rotatable by the piston between locking and unlocking positions, and an electrically-driven actuator (e.g. a motor with a rotatable axel) that is coupled to the piston and configured to arrest the piston from axial displacement to the extended position and permits such extension in another state.

The cylinder defines a proximally-distally cylinder axis, which once the lock body is within the lock cavity, extends between the closure's external face and an inner end wall of the cavity, the axis being essentially normal to the inner wall. The locking piston is received within the cylinder and rotatable about the cylinder axis between a locking position and an unlocking position. The piston is also axially displaceable within the cylinder between a rest position, in which the locking piston is received entirely within the cylinder, a retracted position in which the distal end of the piston is more proximal to the inner wall than in the rest position, and an extended position in which a proximal end protrudes out of the cylinder. When in the extended position, the proximal end of the piston is user-accessible and may be rotated by a user from the locking position to the unlocking position, and vice versa. As will be noted from the description below, pushing the cylinder into the retracted position, against the biasing force of the biasing member, by pressing on the proximal end of the piston (that in the rest state can only be manipulated by such pressing), brings the distal end of the piston to come into contact with one or more piston detector switches fitted in said inner wall and leads to activation of an electronic utility of the lock to open the lock, as will be discussed below.

The piston, as noted above, is associated with a biasing member, for example a helical spring, fitted around a fixed shaft received within an elongated bore in the cylinder. The biasing member biases the piston in a forward direction, namely in a direction of displacement of the piston into the extended position in which its proximal end protrudes out of the cylinder. Thus, once the actuator switches into the unblocking position (as will be defined below), the piston moves forward.

The distal end of the piston is associated with a lock cam and is rotatable therewith between an engaging state in which the cam engages a cam-engaging element of the lock cavity, and an open state, in which the cam is disengaged from the cam-engaging element and the lock can be opened. The rotation of the piston, and hence the rotation of the cam, is only enabled when the proximal end of the piston protrudes out of the cylinder in the extended position of the piston.

The electrically-driven actuator is associated with a blocking pin, and is configured for switching between a blocking state and an unblocking state. In the blocking state, the actuator forces the blocking pin into a blocking position to engage the piston so as to arrest the piston in the rest position; in the unblocking state, the blocking pin is displaced into an unblocking position in which it does not engage the piston, to thereby permit a biased axial displacement of the piston into the extended position.

The electronic utility comprises a communication and control module, and one or more piston detector switch elements that are disposed in the inner wall and are in electric communication, through a piston detector circuit, with the communication and control module. The piston detector switch elements are engageable by the piston when in the retracted position to close the piston detector circuit. The piston detector switch elements are typically spring-biased pins. The piston detector circuit may be closed, by one embodiment, through the piston and the lock body when the piston is in the retracted position. By an embodiment of this disclosure, there is one such piston detector switch element. By other embodiments, there may be more than one, e.g. two, such switch elements and the piston detector circuit may be closed between these two switch elements through the piston.

The control and communication module is configured for switching from a dormant state to an active state upon closing of the piston detector circuit. Upon such awakening into an active state, the module can receive an authentication signal from a user-held device, typically a smartphone with a suitable software utility permitting the smartphone to generate and transmit the authentication signal, via wireless communication protocols, e.g. wi-fi or Bluetooth communication protocols. Once such signal is received, the communication and control module causes the activation of the electrically-driven actuator to switch from the blocking state to the unblocking state. Upon reclosing of the piston detector circuit, achieved by pressing the piston from the extended position into the retracted position, the control and communication module causes the actuator to switch back into the blocking state, thereby locking the lock.

By one embodiment, the control and communication module and a power source, e.g. a battery, are outside the lock cavity and disposed in an inner side of the closure. It should be noted that, by some embodiments, the electronic utility may be powered by a power source other than a battery, for example a power source within the space closed by the closure, such as a power line of a communication infrastructure. When retrofitting a half-cylinder lock by that of the current disclosure, other than fitting the lock body inside the lock cavity, the piston detector switch element is fitted into the inner wall of the lock cavity and the electronic utility is fitted at the inner face of the closure. Other contact elements may also be fitted in the inner wall of the lock cavity for electrical coupling of the control and communication module to the actuator and other electronic elements within the lock body.

The electrically-driven actuator may, by one embodiment, be an electric motor with the switching between its two states being through rotation. The motor is typically arranged such that its rotation axel is axially-oriented. The axel of the motor may be coupled to a motor cam while the axel's rotation and, hence, that of the cam, displaces the blocking pin from the blocking position to the unblocking position, and vice versa. The blocking pin may be spring-biased into its unblocking position.

The lock may comprise a motor detector switch that is engaged by the motor cam when the motor is in its blocking state, and is disengaged from the motor cam when the motor is in its unblocking state. The motor detector switch is in electric communication with the control and communication module through a motor detector circuit. The control and communication module may be configured to, upon closure of the piston detector circuit, (i) if the motor detector circuit is closed, seeking an authentication signal from a user-held device and upon receipt of such signal, outputting an opening command for rotating the motor to the unblocking state, and (ii) if the motor detector circuit is open, outputting and closing command for rotating the motor to the blocking state.

Upon or after outputting an open command and identifying through opening of the motor detector circuit, the control and communication module may transmit a lock open state indication to the user-held device; upon or after outputting a closing command and identifying through closing of the motor detector circuit, the control and communication module may transmit a lock closed state indication to the user-held device.

The present disclosure also provides, by another of its embodiments, a half cylinder lock that comprises a communication and control module; a locking piston; and an electric motor. The locking piston of this embodiment is axially rotatable about a proximally-distally extending axis between locking position and an unlocking position in which the lock can be opened and axially displaceable between a rest position, a retracted position in which the distal end of the piston engages a piston detector switch that is electrically linked with said module through a piston detector circuit, and an extended state in which a proximal end of the piston is user-accessible to permit rotation of the piston between said locking and unlocking positions. The electric motor is rotatable between a blocking state in which it blocks axial displacement of the locking piston to the extended state and an unblocking state in which such axial displacement is enabled, the electric motor being coupled to a motor detector switch that is electrically linked with said module through a motor detector circuit, the motor detector circuit being closed when the motor is at its blocking state and is open when the motor is in the unblocking state. The control and communication module is configured for (i) switching from a dormant state to an active state upon closing of the piston detector circuit, (ii) receiving an authenticating signal from a user-held device, (iii) upon receipt of such signal activate the motor to switch it into the unblocking position, and (iv) upon re-closing of the piston detector circuit, switching said motor back into the blocking position.

The control and communication module of the lock of the embodiment describe in the previous paragraph may be configured to, upon closure of the piston detector circuit, (i) if the motor detector circuit is closed, seeking an authentication signal from a user-held device and upon receipt of such signal, outputting an opening command for rotating the motor to the unblocking state, and (ii) if the motor detector circuit is open, outputting and closing command for rotating the motor to the blocking state.

Also provided by an aspect of this disclosure is a closure comprising a lock of this disclosure.

Further provides by an aspect of this disclosure is a lock system comprising a half cylinder lock of this disclosure and one or more user-held devices configured for communication with the lock's control and communication module, and also configured for communication with an access control server.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

This disclosure provides a half-cylinder lock which is electronically operated, wherein part of the electronic mechanism is separated from the lock body and positioned in the closure's interior, while avoiding some of the issues of prior art electronically operated half-cylinder locks.

The electronically operated half-cylinder lock of this disclosure will be exemplified below, with reference to the drawings, through an embodiment where the half-cylinder lock is fitted in a swing handle closure locking arrangement. It should be understood that the lock of this disclosure is not limited to a swing handle-type closure and can be implemented in a wide variety of closures locked by half-cylinder locks.

Figure 1A:
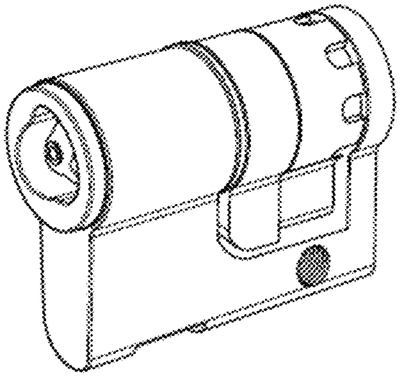
Fig. 1A (Prior art)
FIGS. 1A-1B are pictorial views of example of a prior art half cylinder lock and pre-programmed key, respectively.
Figure 1B:
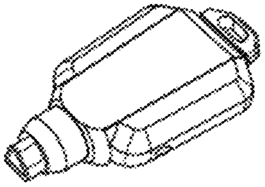
Fig. 1B (Prior Art)
Figure 2A:
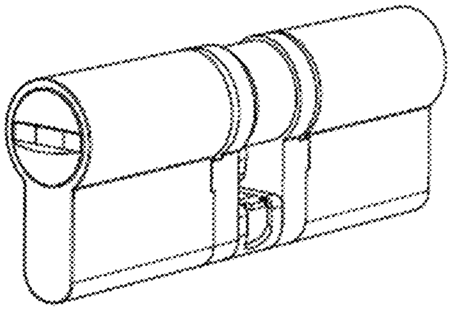
Fig. 2A (Prior Art)
FIGS. 2A-2B are, pictorial views of another example of prior art half cylinder lock and pre-programmed key, respectively.
Figure 2B:
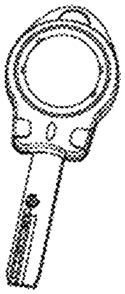
Fig. 2B (Prior Art)
Figure 3:
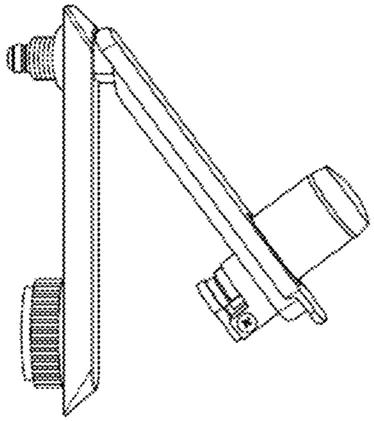
Fig. 3 (Prior Art)
FIG. 3 is a pictorial view of an exemplary prior art half-cylinder lock, fitted on a swing handle.
Figure 4A:
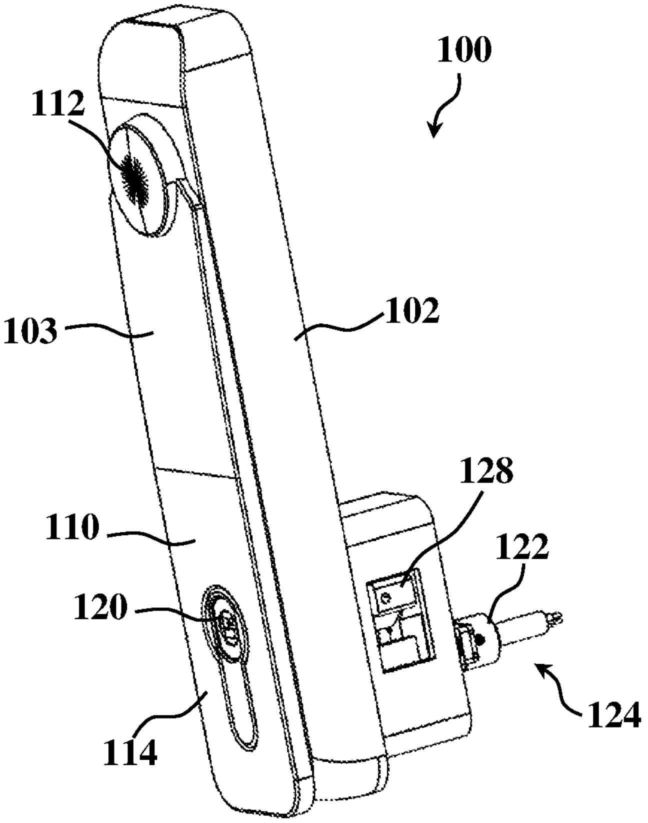
FIGS. 4A-4B show a half-cylinder lock according to an embodiment of this disclosure, in a respective locked and open states.
Figure 4B:
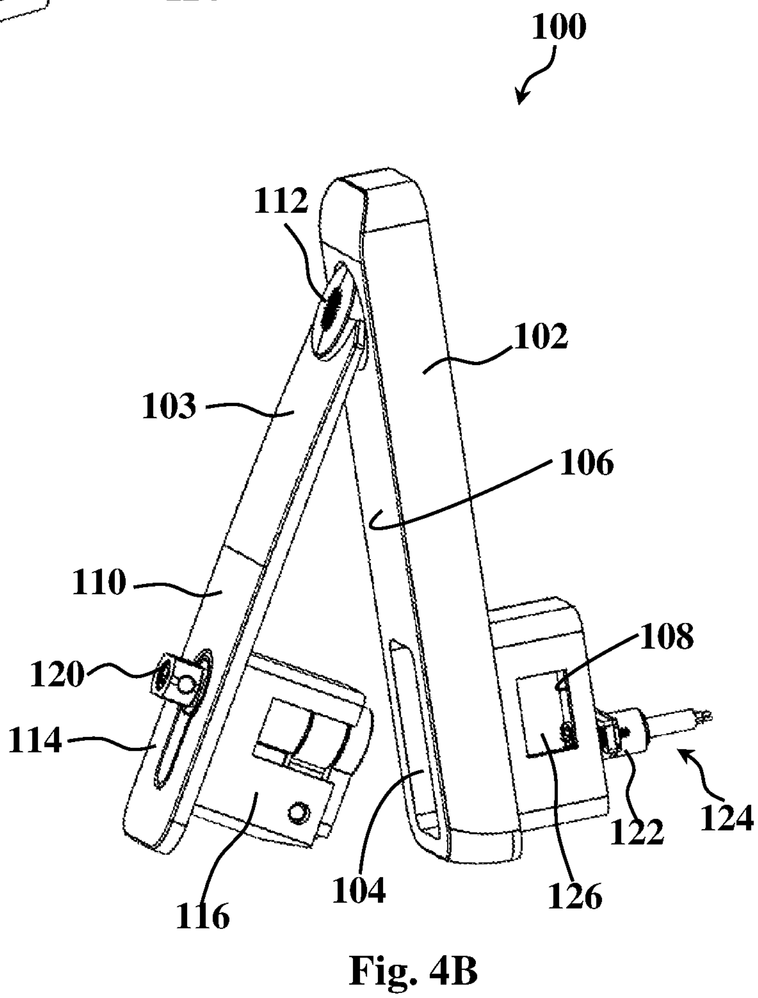

A swing-handle operated half-cylinder lock according to an embodiment of this disclosure is shown in FIGS. 4A-4B, in respective locked and open states. The assembly 100 includes a base member 102 and a swing-handle 103. The base member 102 is configured for association with a closure (not shown) and having a receiving lock cavity 104 that is defined between external face 106 of the base member, that defines part of the external face of the closure, and an inner end wall 108.

The swing-handle 103 has an arm 110 extending from a pivot 112 by which it is pivotably coupled to the base member 102, to an arm end portion 114 that holds a lock body 116. The arm 110 is pivotably moveable between a locked state shown in FIG. 4A and an open state shown in FIG. 4B, in which the arm is angled with respect to the external face 106 and the lock body 116 is outside of the lock cavity 104. As can also be seen, a proximal portion 120 of the lock piston, to be described below, projects from the lock's cylinder (to be described below) when in the open state, as seen in FIG. 4B, while being accommodated entirely within the lock body in the locked state as shown in FIG. 4A.

Other elements that can be seen in FIGS. 4A-4B, include portions 122 of the electronic utility 124 fitted in the inner side of end wall 108, as well as a lock-engaging opening 126, which in the locked state engages with a lock cam 128 that is disengaged therefrom in the open state, permitting opening of the lock.

Referring now to FIGS. 5A-5E, seen in cross-section, is the lock body 116, that comprises a cylinder 130, defining a proximally-distally extending cylinder axis 132 (the distal direction being represented by arrowhead 134). For convenience the proximal-distal direction will be referred herein as "backward" and the opposite direction will be referred to as "forward".

Figure 5A:
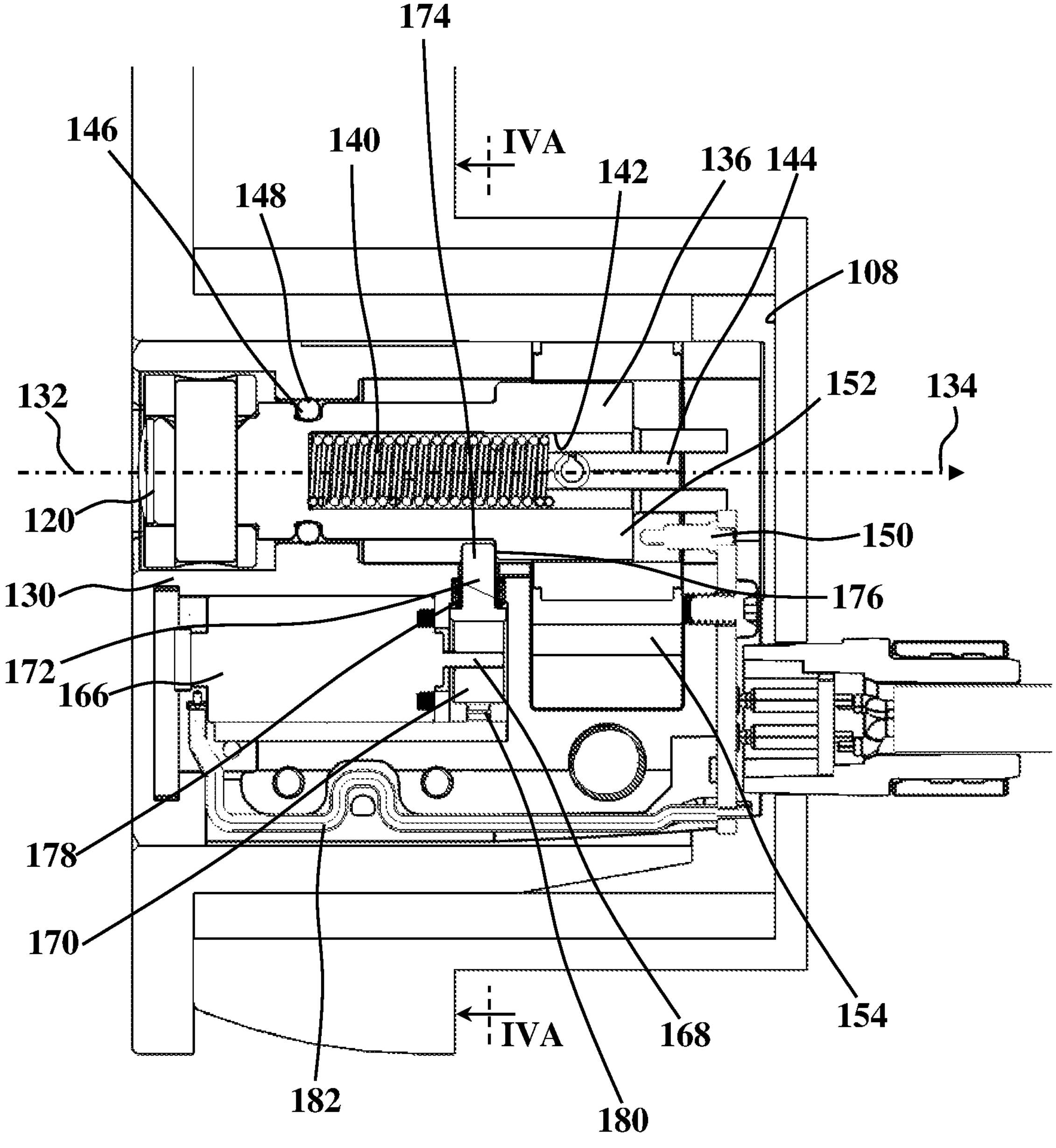
FIGS. 5A-5D show longitudinal cross-sections through the lock body and the receiving lock cavity in successive operational stats of the lock.
Figure 5B:
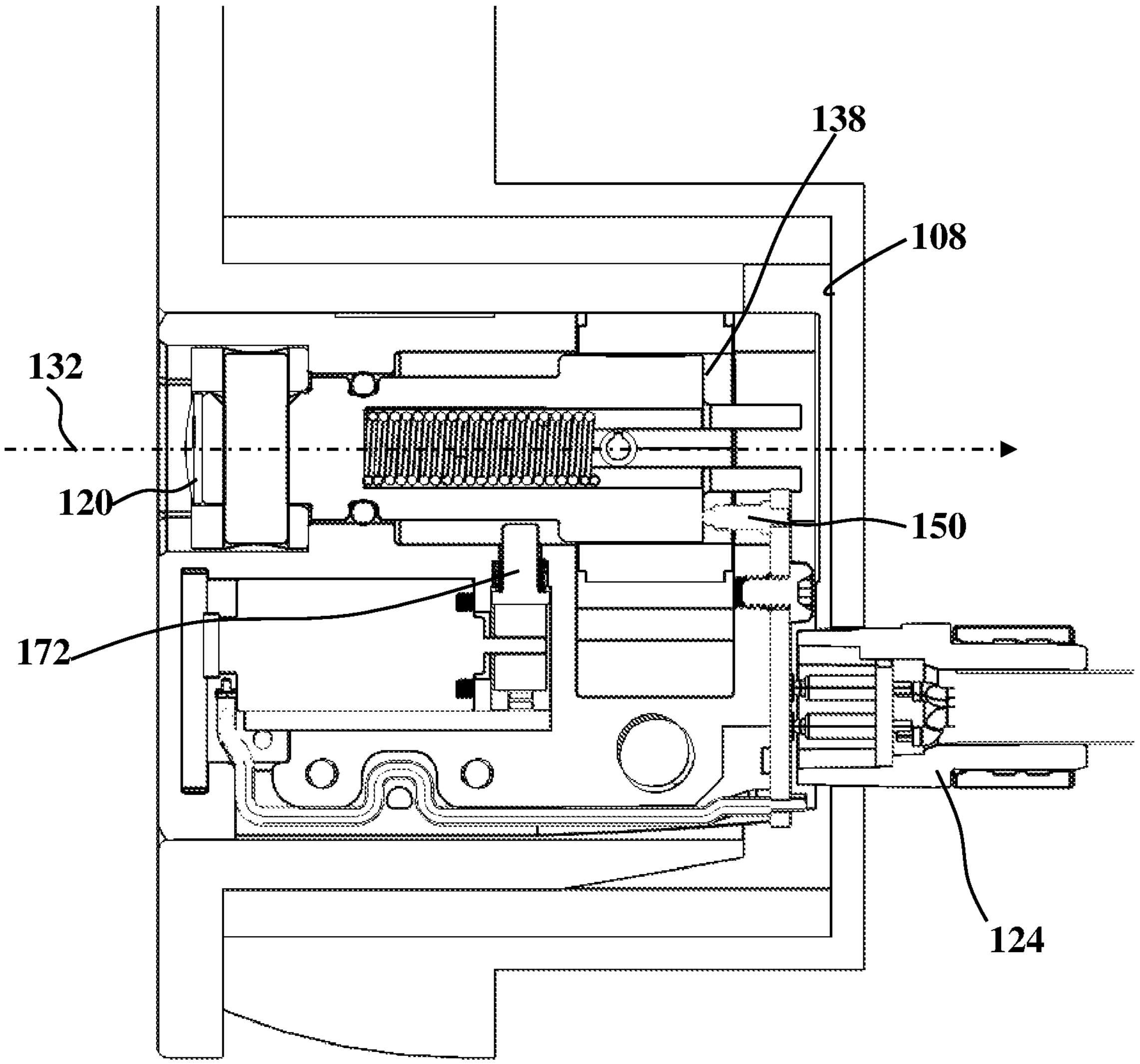
Figure 5C:
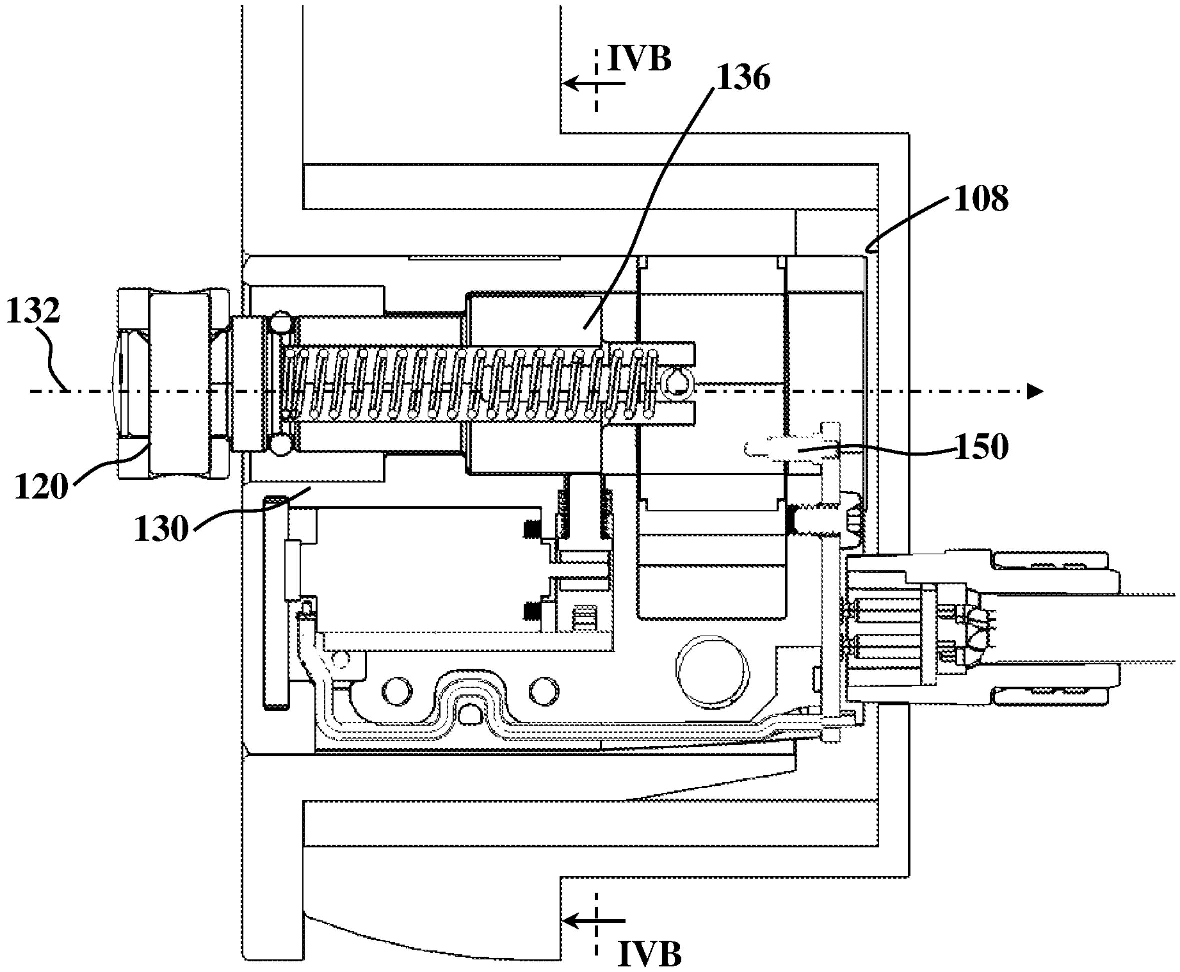
Figure 5D:
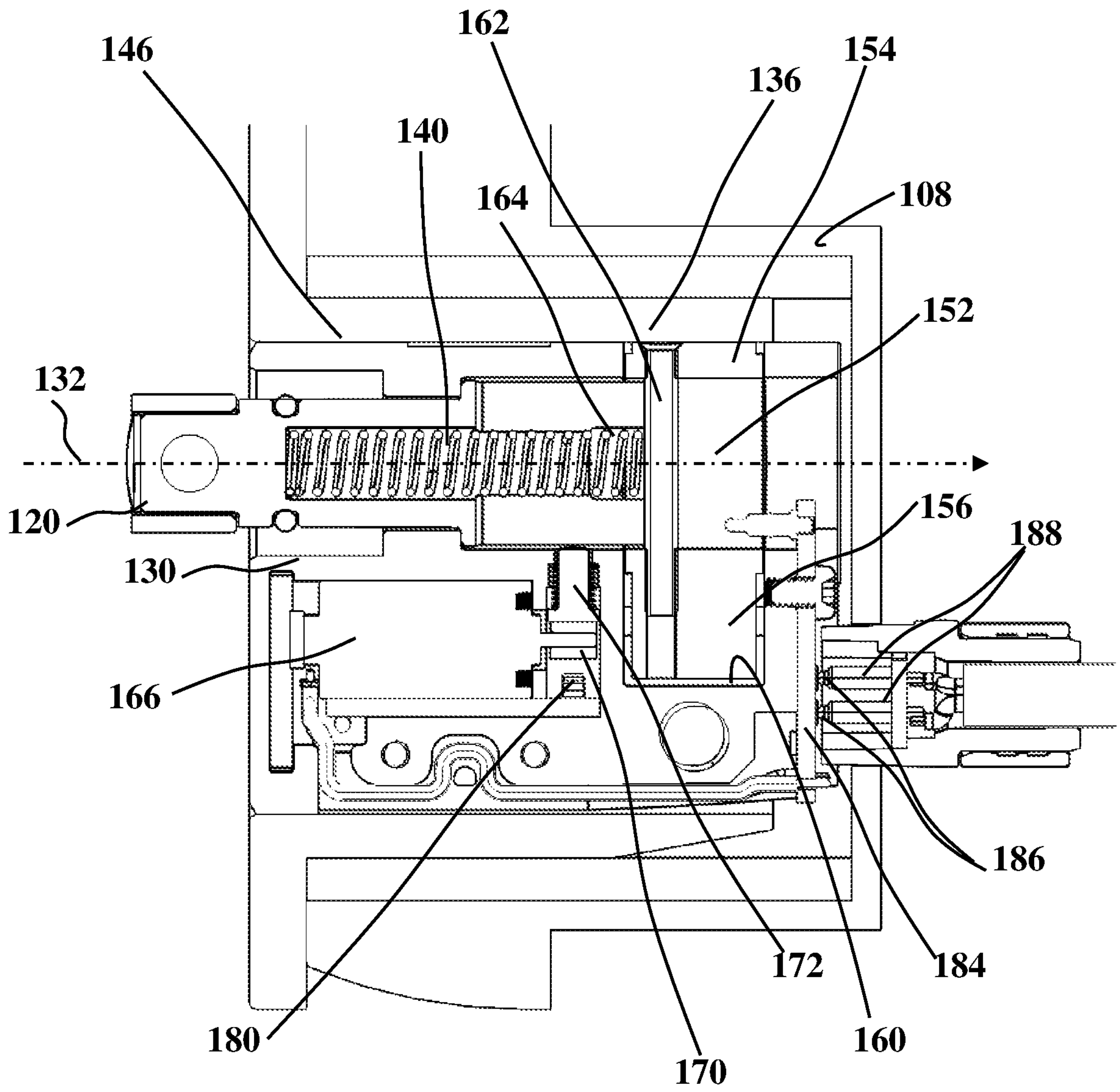
Figure 5E:
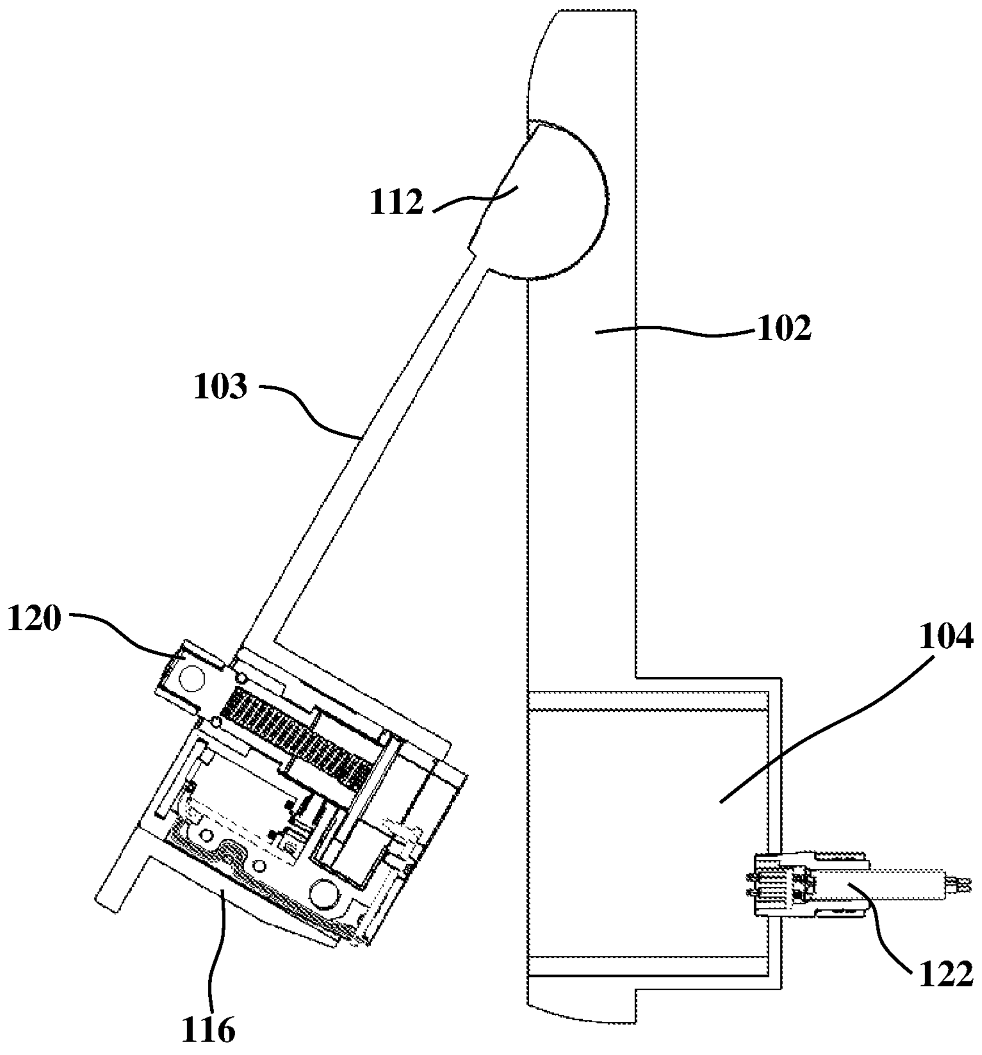
FIG. 5E is a longitudinal cross-section of the lock in the open state, which is successive to the state of FIG. 5D.

Housed within cylinder 130, is a locking piston 136 that is rotatable about axis 132 between a locking position seen in FIG. 5A and an unlocking position seen in FIGS. 5D-5E. The piston 136 is also axially displaceable between a rest position shown in FIG. 5A, in which the locking piston is received entirely within the cylinder 130, an extended position in which a proximal end 120 thereof protrudes out of the cylinder (as seen in FIGS. 5D-5E), and a retracted position in which the distal end 138 of the piston proximates the end wall 108 of the lock cavity as seen in FIG. 5B.

As can also be seen in FIGS. 5A-5D, the piston 136 is forwardly-biased by a biasing spring 140, the biasing spring being accommodated within piston bore 142 and coiled about shaft 144 of the piston. Fitted within an annular groove 146 of piston 136 is an O-ring 148 that provides environmental seal for the inner parts of the lock.

Another element that can be seen in FIGS. 5A-5E is piston detector switch 150, which in the exemplified embodiment is a spring-biased contact pin (with the biasing spring not shown), which is engaged by the distal end 138 of the piston when the piston is in the retracted position (as seen in FIG. 5B). Such engagement closes a piston detector electric circuit, and as also explained below, awakens the processor of the electronic utility 124. When so awakened, the processor is ready to receive an authentication signal from a user-held device, e.g. a smartphone running an appropriate software utility; upon receipt of an authentication signal, the sequence described below with reference to FIGS. 5C-5D occurs.

Figure 6A:
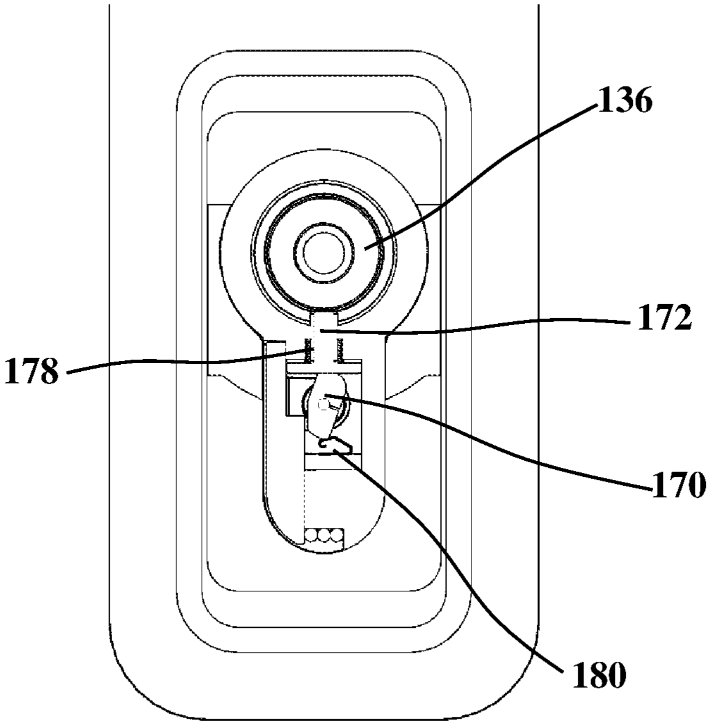
FIG. 6A shows a cross-section of the lock along line IVA-IVA in FIG. 5A.
Figure 6B:
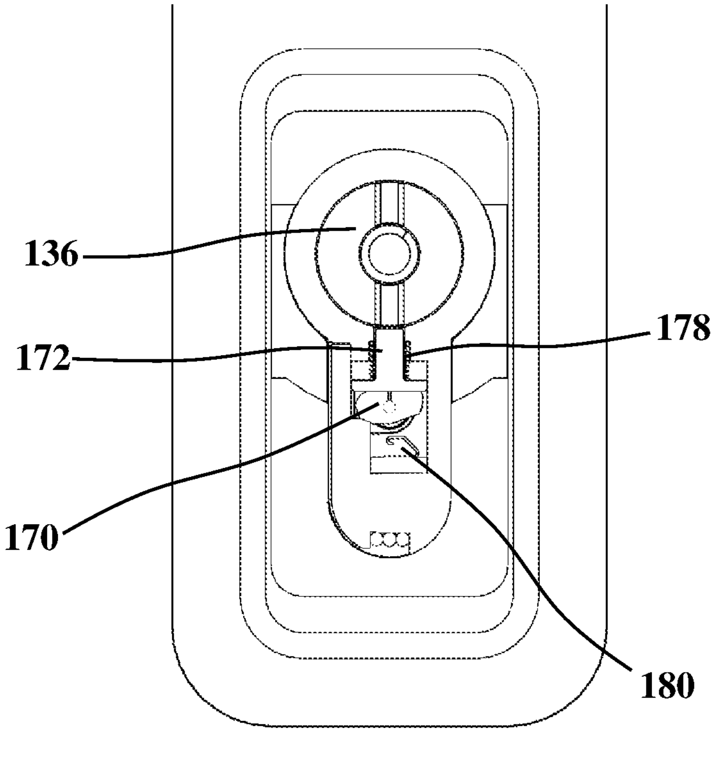
FIG. 6B shows a cross-section of the lock along line IVB-IVB in FIG. 5C, showing the operational positions of the motor cam.

As seen in FIGS. 5A-5D, associated with a distal end portion 152 of piston 136 is a lock cam 154, which has a lateral projection 156 that, in the states shown in FIGS. 5A-5C, engages lock-engaging opening 126 (see FIGS. 6A-6B), and axially rotates with the cylinder to the position shown in FIG. 5D to be received within receiving space 160. Cam 154 is fixed to the distal end portion 152 of the piston 136 by means of screw 162; screw 162 also serves as a resting surface for the distal end 164 of biasing spring 140.

Also seen in FIGS. 5A-5D is an electrically driven actuator in the form of motor 166, having a motor axel 168 coupled to a motor cam 170. Cam 170 engages a blocking pin 172 to hold the blocking pin 172 in its upward, blocking position (shown in FIG. 5A). The terms "upward" and "downward" are made in reference to the orientation of FIG. 5A, it being understood that when in-situ the orientation may be opposite, and what is referred to herein as "upward" may be "downward", etc. When in its upward, blocking position, pin head 174 of blocking pin 172 engages shoulders 176 of piston 136, arresting the piston from a forward-directed displacement. Blocking pin 172 is downwardly biased to an unblocking position by biasing spring 178. When the motor is operated, it rotates axle 168 and with it the motor cam 170 from the blocking state seen in FIGS. 5A-5B and FIG. 6A into the unblocking state seen in FIGS. 5C-5D and FIG. 6B, in which blocking pin 172 can downwardly displace by the biasing force of spring 178 in the unblocking position, releasing the piston's shoulders 176 to thereby permit the axial forward displacement of piston 136.

Also seen in FIGS. 5A-5D and FIGS. 6A-6B is a motor detector switch 180 engageable by the motor cam 170. The motor detector switch 180 is linked to the processor of the electronic utility through a motor detector circuit (see below) and the engagement provides an indication of the blocking state of the motor 166 (or cam 170), and disengagement provides an indication of the unblocking state of the motor (namely that the lock is open).

Electric leads 182 (there are three such leads in this specific example, to permit rotation and counterrotation of the motor) link the motor and the electronic utility and provide power to the motor. The link to the electronic utility is through printed circuit board (PCB) 184 that is provided with contact points 186 that are pressure-engaged with connector pins 188, that have each a spring biased pin head that bears on the contact points 186.

In the locked state shown in FIG. 5A, the piston 136 is blocked from forward axial displacement by blocking pin 172. When the user presses the proximal end 120 of the piston in a rearward direction, the piston is displaced into the retracted position, end its distal end 138 comes into contact with piston detector switch 150 to close a piston detector circuit to thereby awaken the processor of the electronic utility. If the processor then receives an authenticating signal from a user-held device, transmitted wirelessly, the processor activates motor 166 to rotate, bringing to rotation of the motor cam 170 from the blocking state shown in FIGS. 5A-5B to the unblocking state shown in FIGS. 5C-5D. Consequently, blocking pin 172 is downwardly displaced into its unblocking position, permitting the forward axial displacement of piston 136. The piston's proximal portion 120 can then be held by the user and rotated about axis 132 to cause lock cam 154 to rotate from its state in FIGS. 5A-5C to that in FIG. 5D. Upon such rotation, the lock can be opened as seen in FIG. 5E.

For locking, the lock body 116 is pushed back into lock cavity 104, proximal portion 120 of piston 136 is rotated to bring projection 156 of the lock cam 154 to engagement with the lock-engaging opening 126. Then the piston 136 may be pushed in the rearward direction, and upon reaching the retracted position it engages pin 150 that causes the motor to rotate back into the blocking state, pushing blocking pin 172 upwardly back to its blocking position.

Figure 7:
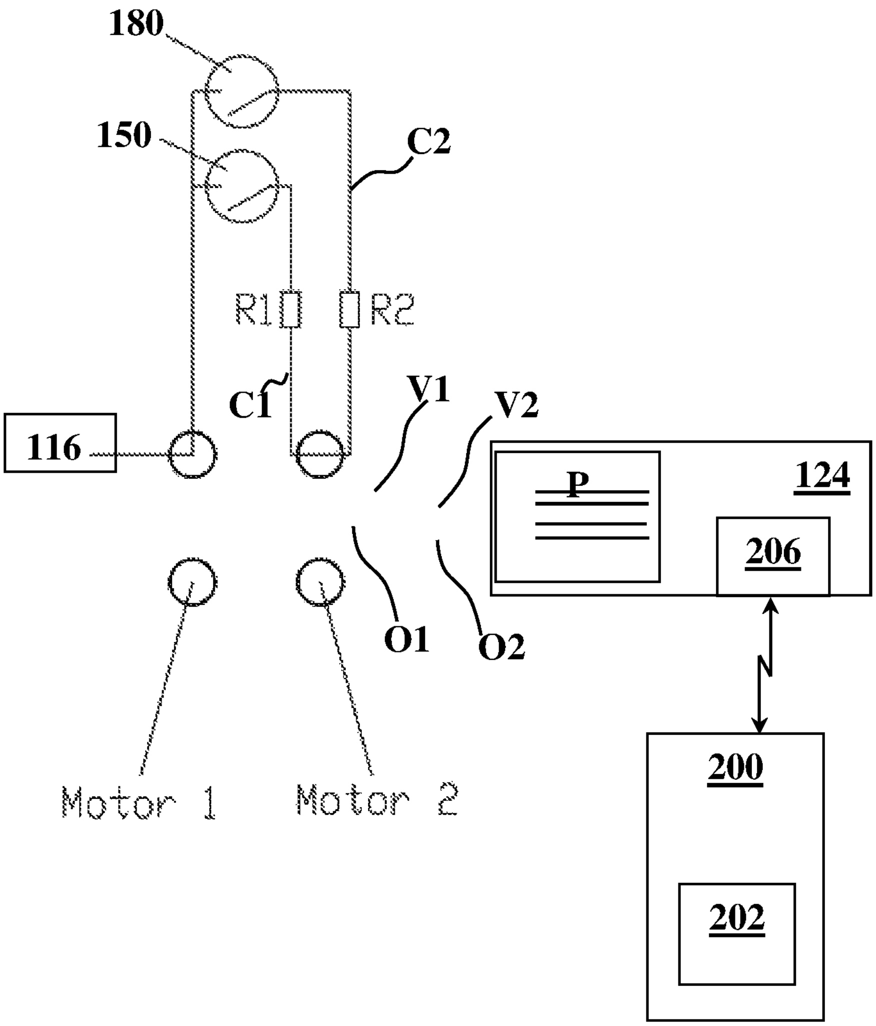
FIG. 7 is a schematic representation of the electronic utility according to an embodiment of this disclosure.

FIG. 7 is a schematic representation of the electronic utility. Piston detector switch 150 is part of a piston detector circuit C1 that includes resistor R1, and motor detector switch 180 is part of a motor detector circuit C2 that includes resistor R2. Upon contact between the piston 136 and piston detector switch 150, the circuit C1 is closed through lock body 116, and similarly upon engagement of motor detector switch 180, circuit C2 is closed through the lock body 116. Processor P has analogue inputs (V1,V2) measuring the potential across circuits C1 and C2, and in this way determination can be made whether each of both of the circuits are opened or closed, providing various indications of the lock's status. The processor P has also analogue outputs O1 and O2 providing voltage to the motor for rotation and counterrotation, as the case may be.

Upon closure of the piston detector circuit C1, the processor of the control and communication module 124 is awoken and checks status of the motor detector circuit. If the motor detector circuit C2 is closed, this signifies that the lock is locked and the control and communication module seeks an authentication signal from a user-held device 200, operating a suitable software utility 202 and communicates, through appropriate wireless communication protocol, with the control and communication utility 124 through transceiver 206. Upon receipt of such signal, the control and communication module 124 outputs an opening command for rotating the motor to the unblocking state. Alternatively, in case the motor detector circuit C2 is open, this signifies that the lock is open, and the control and communication module 124 outputs a closing command for rotating the motor to the blocking state, thereby locking the lock.

Further, upon or after outputting an opening command, the control and communication module 124 transmits, through opening of the motor detector circuit, to the user-held device 200, a lock open state indication. In addition, upon or after outputting a closing command, the control and communication module 124 can transmit, through closing of the motor detector circuit, to the user-held device, a lock closed state indication, that can then be transmitted or otherwise communicated to a central control server.

The invention claimed is:

1. A half-cylinder lock, comprising:

a lock body, receivable in a lock cavity that is defined in a closure between an external face of the closure and an inner end wall of the lock cavity, the lock body comprises a cylinder defining a proximally-distally extending cylinder axis which, once the lock body is within the lock cavity, extends between said external face and said inner end wall, a locking piston received within the cylinder and rotatable about the cylinder axis between a locking position and an unlocking position and axially displaceable within the cylinder between a rest position, in which the locking piston is received entirely within the cylinder, a retracted position in which the distal end of the piston proximates the inner end wall and an extended position, in which a proximal end thereof protrudes out of the cylinder permitting rotation of the cylinder by a user between the unlocking and locking positions;

a biasing member for biasing the piston into the extended position, a lock cam, associated with a distal end portion of the locking piston and rotatable therewith between an engaging state, in which the cam is engaged with a cam-engaging element of the lock cavity and an open state, in which the cam is disengaged from the cam-engaging element and the lock can be opened, an electrically-driven actuator configured for switching between a blocking state in which the electrically-driven actuator forces a blocking pin into a blocking position to engage the piston so as to arrest it in the rest position and an unblocking state in which the blocking pin is displaced into an unblocking position, in which the blocking pin does not engage the piston to thereby permit a biased axial displacement of the piston into the extended position; and an electronic utility, that comprises control and communication module, one or more piston detector switch elements in said end wall and in electric communication through a piston detector circuit with said module, said elements being engageable by the piston when in said retracted position to close said circuit, the control and communication module being configured for (i) switching from a dormant state to an active state upon closing of the piston detector circuit, (ii) receiving an authenticating signal from a user-held device (iii) upon receipt of such signal activate the electrically-driven actuator to switch said actuator into the unblocking state and (iv) upon re-closing of the piston detector circuit, switching said actuator back into the blocking state.

2. The lock of claim 1, wherein the control and communication module and a power source, is outside said lock cavity disposed at an inner side of the closure.

3. The lock of claim 1, wherein the piston detector circuit is closed through the piston and the lock body.

4. The lock of claim 3, wherein the piston detector circuit comprise a contact member, the contact member is a spring-biased pin.

5. The lock of claim 1, comprising one piston detector switch.

6. The lock of claim 1, wherein the electrically-driven actuator is an electric motor, and wherein said switching is through rotation.

7. The lock of claim 6, wherein the electric motor rotates axially.

8. The lock of claim 6, wherein the electric motor has a rotatable axle coupled to a motor cam, the rotation of which displaces the blocking pin between said blocking and said unblocking position.

9. The lock of claim 8, wherein the blocking pin is spring-biased into the unblocking position.

10. The lock of claim 8, comprising a motor detector switch engaged by the motor cam in its blocking state, disengaged in the unblocking state and in electric communication through a motor detector circuit with said module.

11. The lock of claim 10, wherein the control and communication module is configured to, upon closure of the piston detector circuit, (i) if the motor detector circuit is closed, seeking an authentication signal from a user-held device and upon receipt of such signal, outputting an opening command for rotating the motor to the unblocking state, and (ii) if the motor detector circuit is open, outputting and closing command for rotating the motor to the blocking state.

12. The lock of claim 11, wherein (i) upon or after outputting an opening command and identifying, through opening of the motor detector circuit, the control and communication module transmits, to the user-held device, a lock open state indication, and (i) upon or after outputting a closing command, and identifying, through closure of the motor detector circuit, the control and communication module transmits, to the user-held device, a lock closed state indication.

13. The lock of claim 1, wherein the lock is configured for use with a swing handle locking arrangement, with the lock body fitted at an end portion of a swing handle which is pivotably coupled to the external face of the closure and displaceable between a locked state in which the swing handle is flush with said external face and the lock body being received within the lock cavity, and an open state, in which the swing handle is angled with respect to the external face and the lock body is outside the lock cavity.

14. A half cylinder lock comprising:

a control and communication module;

a locking piston, axially rotatable about a proximally-distally extending axis between locking position and an unlocking position in which the lock can be opened and axially displaceable between a rest position, a retracted position in which the distal end of the piston engages a piston detector switch that is electrically linked with said module through a piston detector circuit, and an extended state in which a proximal end of the piston is user-accessible to permit rotation of the piston between said locking and unlocking positions;

an electric motor rotatable between a blocking state in which the electric motor blocks axial displacement of the locking piston to the extended state and an unblocking state in which such axial displacement is enabled, the electric motor being coupled to a motor detector switch that is electrically linked with said module through a motor detector circuit, the motor detector circuit being closed when the motor is at the blocking state and is open when the motor is in the unblocking state;

the control and communication module being configured for (i) switching from a dormant state to an active state upon closing of the piston detector circuit, (ii) receiving an authenticating signal from a user-held device, (iii) upon receipt of such signal activate the motor to switch the motor into the unblocking position, and (iv) upon re-closing of the piston detector circuit, switching said motor back into the blocking position.

15. The lock of claim 14, wherein the control and communication module is configured to, upon closure of the piston detector circuit, (i) if the motor detector circuit is closed, seeking an authentication signal from a user-held device and upon receipt of such signal, outputting an opening command for rotating the motor to the unblocking state, and (ii) if the motor detector circuit is open, outputting and closing command for rotating the motor to the blocking state.

16. A closure comprising a lock of claim 1.

17. A closure comprising a lock of claim 14.

* * * * *